United States Patent [19]
Asano

[11] 3,943,535
[45] Mar. 9, 1976

[54] FILM CASETTE
[75] Inventor: Yoshio Asano, Hyogo, Japan
[73] Assignee: Fuji Photo Film Co., Ltd., Minami-ashigara, Japan
[22] Filed: Dec. 19, 1973
[21] Appl. No.: 426,418

[30] Foreign Application Priority Data
Dec. 20, 1972 Japan............................ 47-127943

[52] U.S. Cl................................ 354/174; 354/277
[51] Int. Cl.² ................................... G03B 19/10
[58] Field of Search .......... 354/174, 178, 179, 275, 354/276, 277

[56] References Cited
UNITED STATES PATENTS

| 437,656 | 9/1890 | Lewis | 354/277 |
| 1,431,445 | 10/1922 | Fairchild | 354/174 |
| 3,108,524 | 10/1963 | Eloranta | 354/178 |
| 3,647,441 | 3/1972 | Bachelder | 354/86 X |
| 3,685,905 | 8/1972 | Marshall | 355/8 |

FOREIGN PATENTS OR APPLICATIONS

| 4,153 | 1908 | United Kingdom | 354/178 |
| 640,288 | 12/1936 | Germany | 354/174 |

Primary Examiner—Monroe H. Hayes
Attorney, Agent, or Firm—Sughrue, Rothwell, Mion, Zinn & Macpeak

[57] ABSTRACT

A film cassette for containing film-sheets comprising a front frame mountable in a complementary camera portion, and forming a generally off-centre opening, a rear frame forming a generally off-centre opening, walls integrally formed with said rear frame and extending to said front frame, a wall integrally formed with said rear frame and extending to the proximity of said front frame, whereby there is formed a passage for removal of film-sheets from said cassette, a light-proof cover sealing said rear frame opening and extending around film-sheets in said cassette, and a light-proof sheet sealing said front frame opening, whereby film-sheets in said cassette may be advanced by a pressure means entering said rear frame opening or mounted on said rear frame and acting through said light-proof cover.

4 Claims, 21 Drawing Figures

FILM CASETTE

The present invention relates to a film cassette, and more particularly to an improved film cassette of simplified construction, permitting film-sheets contained therein to be steadily advanced from the rear in such a manner that successive foremost film-sheets are brought to a position for exposure within a camera.

There has recently been developed a type of film which constitutes a single unit comprising a positive film, negative film and a container holding a processing and developing solution, and which may be developed within a camera, whereby it is possible to obtain a positive print almost immediately after exposure of the film. The type of camera associated with this type of film is generally referred to as an auto-process camera, or similar appellation, and the film itself goes under a variety of trade or popular appellations, such as mono-sheet, instant-print, or film-sheet. For the purposes of the present description, this type of film will be referred to as film-sheet.

It has been known conventionally to contain film-sheets in a cassette, which provides a light-proof protection, and also has a built-in means for advancing film-sheets contained therein towards a foremost position for exposure, and to insert such a cassette into a camera when it is required to take photographs. Such conventional film cassettes have the disadvantage that they are bulky, and so present a problem of weight when it is wished to transport a large number of film-sheets, and also are comparatively unwieldy, and render rapid insertion into a camera difficult. Another considerable disadvantage of conventional film cassettes is that since cassette must be provided with a special means for advancing film-sheets, cassette construction is complex, and cost per film-sheet is increased.

It is accordingly an object of the invention to provide a film cassette which is light, compact, and easily manipulated.

It is a further object of the invention to provide a film cassette which is simple and economical in construction.

In accomplishing these and other objects, there is provided, according to the present invention, a film cassette comprising front and rear support boards, between which a required number of film-sheets is supported and held, and a collapsible light-proof covering. The front support comprises an opening, through which foremost film-sheets may be exposed to light directed through a camera lens, and which is covered by a supplementary light-proof sheet prior to insertion of the cassette in a camera. The rear support board comprises an opening, which is sealed to light by a portion of the cassette light-proof cover, and through which film-sheets in the cassette may be steadily advanced, whereby successive film-sheets are brought to a foremost position for exposure.

These and other objects and features of the present invention will become apparent from the following description taken by way of example with reference to the accompanying drawings, in which.

Before proceeding with the description, it is to be noted that throughout the several attached drawings like numerals refer to like parts. Also, for the purpose of the description, terms such as front, back, forwards, rearwards, upper, lower, right, left, are to be taken as being in reference to a film cassette inserted in a normally upright, forward-pointing camera.

Figure 3:
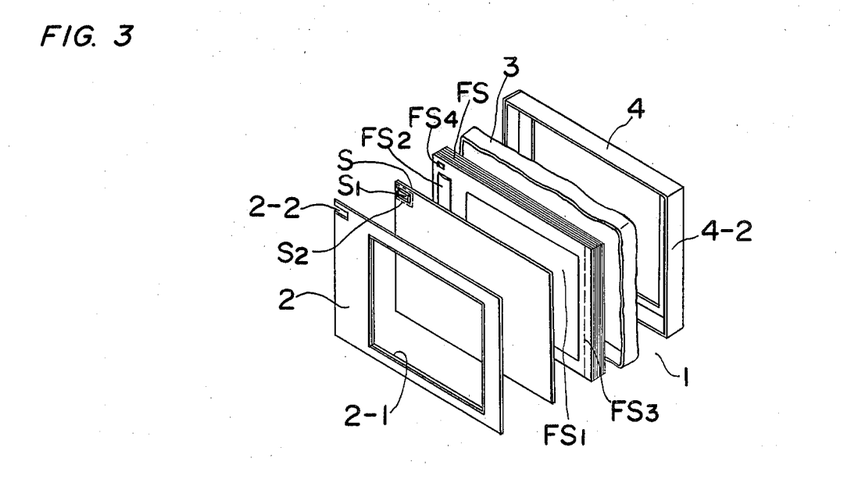
FIG. 3 is an exploded view of the film cassette of FIG. 1.
Figure 4:
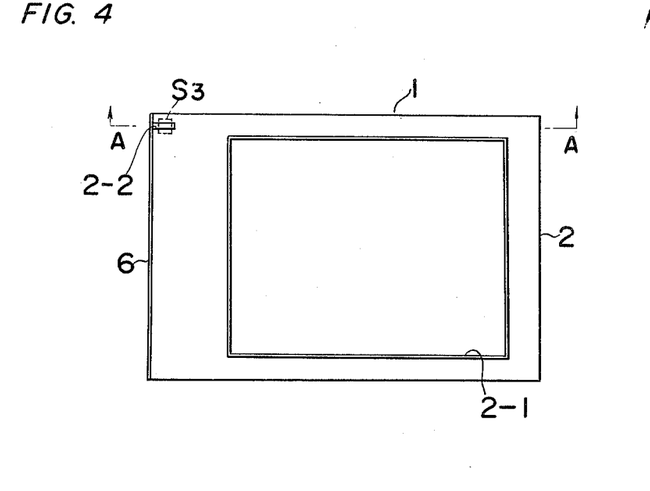
FIG. 4 is a front elevational view of the film cassette of FIG. 1.

In FIGS. 1 to 10, there is shown a cassette 1, which is made of thin plastic sheet, or similar material, has the general appearance of a rectangular case, and is an integral unit comprising a rigid front frame 2, a collapsible, light-proof cover 3, and a rigid rear frame 4. In FIG. 3, there are also shown film-sheets FS, which are contained in the cassette 1. Each film-sheet FS is an integral unit comprising a front, exposure film surface FS1, which is the film-sheet FS surface to be exposed to light reflected from external objects and directed through a camera lens, a rear positive image surface (not shown in the drawing), a sac FS2 containing a conventional solution of processing and developing chemicals, which is slightly thicker than the main body of the film-sheet FS, and is positioned to the right of the film surface FS1, and a wiper board FS3, which is for the removal of excess processing solution extruded from the sac FS2, in a conventionally known manner. Film-sheets FS pass through a camera C right edge first, and each film-sheet FS further comprises an engagement hole FS4 near the top right-hand corners of the front side thereof. The hole FS4 in each film-sheet FS is engaged by a pawl C8, which is provided in the camera C, and removes the film-sheet FS, after exposure thereof.

Figures 1, 2:
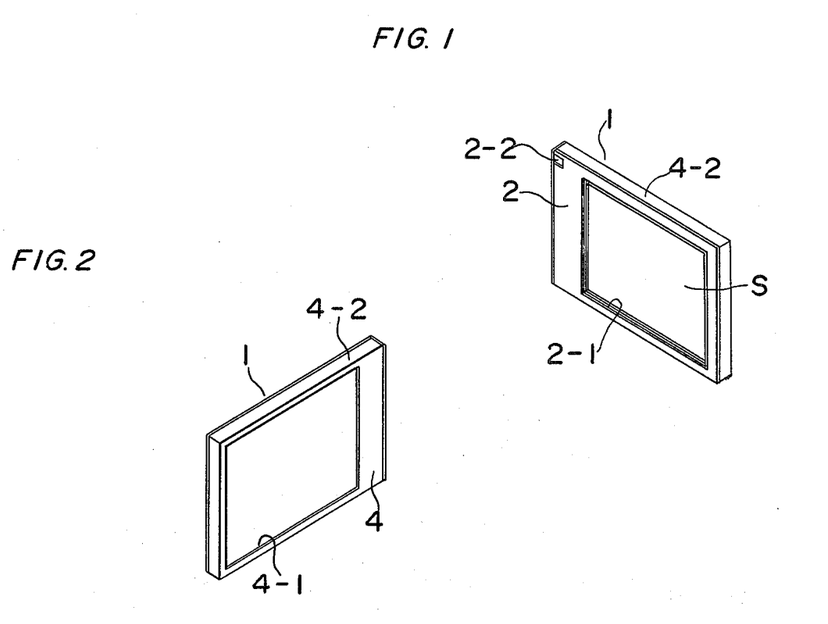
FIG. 1 is a perspective front view of a film cassette according to a list embodiment of the present invention.
FIG. 2 is a perspective rear view of the film cassette of FIG. 1.

As shown in FIGS. 1, 3, the rigid front frame 2 comprises a large, slightly off-centre, rectangular opening 2-1. The front frame 2 is substantially equal in size to, or slightly larger than a film-sheet FS, and the opening 2-1 corresponds in size to a film surface FS1 of a film-sheet FS. The film surfaces FS1 of successive foremost film-sheets FS in the cassette 1 are brought into alignment with the front frame opening 2-1, and may be exposed to light therethrough, as described in further detail below. The right-hand side of the front frame 2 constitutes a comparatively side solid portion, which covers and protects sacs FS4 of film-sheets FS. Near the top right-hand corners of the front-frame 2 there is formed a notch 2—2, extending a short distance leftwards from the right-hand edge of the front frame 2. The notch 2—2 aligns with the abovementioned engagement hole FS4 of film-sheets FS in the cassette 1. When the cassette 1 is inserted in the camera C, the abovementioned pawl C8 may pass through the notch 2—2, to engage the hole FS4 of a foremost film-sheet FS in the cassette 1, and to draw the foremost film-sheet FS rightwards, out of the cassette 1.

Figure 5:
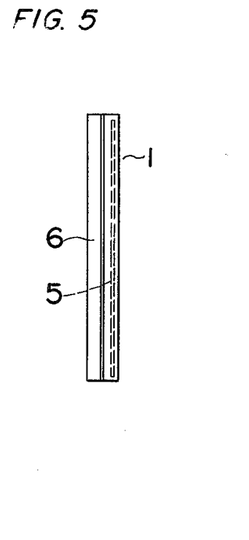
FIG. 5 is a side elevational view of the film cassette of FIG. 4.

As shown in FIGS. 2, 3, the rigid rear frame 4 comprises a rear wall in which there is formed an opening 4-1, and top, bottom and side walls 4-2, which extend forwards from the rear wall. The opening 4-1 in the rear wall permits a pressure means, such as a flexible pressure plate C4, provided in the camera C to pass therethrough, and contact and apply forwards pressure on film-sheets FS contained in the cassette 1. The top and bottom and left-hand side walls 4-2 extend forwards solidly from the rear wall to the front frame 2. The right-hand side wall 4-2 extends to and is fixedly attached to the front frame 2, adjacent to the right-hand edge thereof, but part of the front edge of the right-hand side wall 4-2 stops short of the front frame 2, whereby there is formed a slit 5, as shown in FIGS. 5 and 6, which is described in further detail below.

Figure 6:
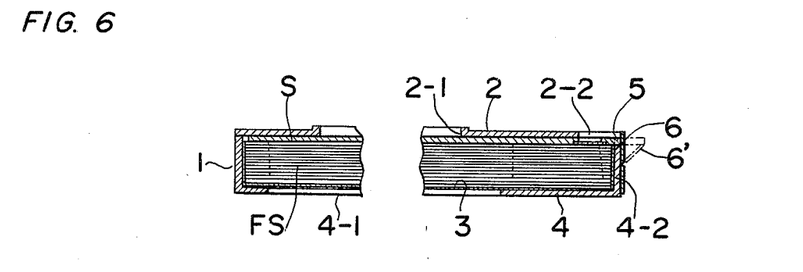
FIG. 6 is a cross-sectional view, on an enlarged scale, taken through the line A—A of FIG. 4.
Figure 7:
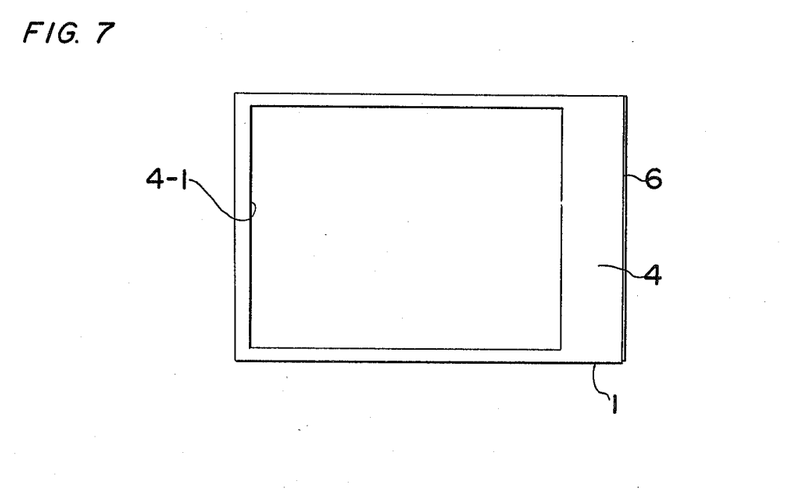
FIG. 7 is a rear elevational view of the film cassette of FIG. 4, FIGS. 8, 9, 10 are cross-sectional views illustrating the stages of insertion of the film cassette of FIG. 1 into a camera, exposure of film-cassettes, and emptying of a cassette, respectively.

As shown in FIG. 3, and also in FIG. 6, the cover 3 forms a bag-like protection, the rear end of which fits into the inside of the rear frame 4, and which extends forwards to the vicinity of the front frame 2 and covers film-sheets FS contained in the cassette 1. The cover 3 is made of a collapsible, light-proof plastic, such as polyethelene, or similar material, and ensure exclusion of light through the opening 4-1 of the rear frame 4. The forward edge of the cover 3 is bonded to the forward ends of the top, bottom, and side walls 4-2. The cover 3 does not cover the abovementioned slit 5, but otherwise completely covers film-sheets FS in the cassette 1. Still referring to FIGS. 3, 6, during non-use of film-sheets FS, that is, prior to loading thereof in a camera, the film-sheets FS are protected from exposure to light through the opening 2-1 of the front frame 2 by a supplementary light-proof sheet S. The light-proof sheet S is rectangular, and has the same general dimensions as, or slightly smaller than the front frame 2, and is lightly bonded thereto, and thus completely closes the front frame opening 2-1, at the rear side thereof. Near the top right-hand corners of the supplementary sheet S there is formed an engagement hole S1, which lies opposite the front frame notch 2—2, when the sheet S is in the cassette 1, and which may be engaged by the abovementioned pawl C8, in the camera C, to permit withdrawal of the sheet S. To ensure exclusion of light through the notch 2—2 into the cassette 1, a patch S2 of stiff light-proof paper, or other suitable material, is stuck over the engagement hole S1, as indicated by a dotted line in FIG. 3. The pawl C8 may pierce the patch S2, and so engage the hole S1.

Referring now to FIGS. 4–7, the abovementioned slit 5, at the front end of the right-hand side wall 4-2, extends vertically, and has the dimensions permitting the supplementary sheet S, or one film-sheet FS at a time, to be drawn therethrough. The slit 5 is normally sealed by a flap 6. The flap 6 is constituted by a plate spring or similar element, which is pivotally mounted on the outside of the right-hand side wall 4-2. The elastic force of the flap 6 urges the flap 6 to lie flat with respect to the right-hand side wall 4-2, and completely cover the slit 5, thereby ensuring exclusion of light through the slit 5. When the supplementary sheet S, or a film-sheet FS is withdrawn through the slit 5, the flap 6 is moved outwards, in opposition to the natural spring force thereof, to the position indicated by the two-dot chain line portion of FIG. 6.

As described above, prior to insertion of the cassette 1 into the camera C, film sheets FS contained in the cassette 1 are completely protected from light, the rear frame opening 4-1 being sealed by the rear portion of the cover 3, the front frame opening being sealed by the supplementary sheet S, the supplementary sheet engagement hole being sealed by the patch S2, and the slit 5 being sealed by the flap 6.

Figure 8:
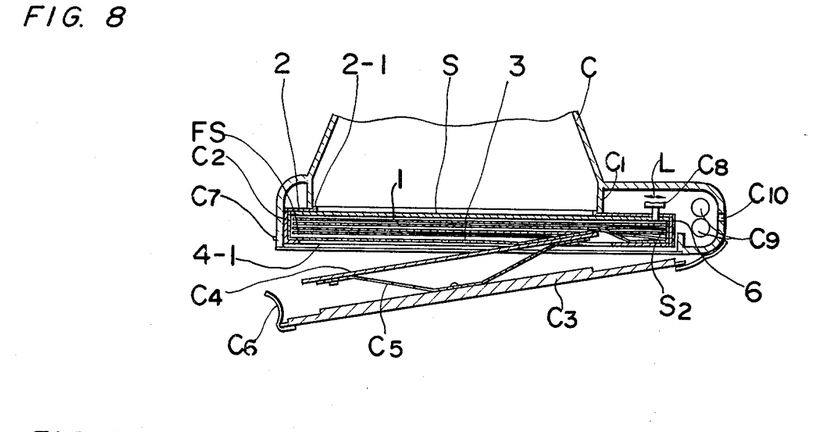
Figure 9:
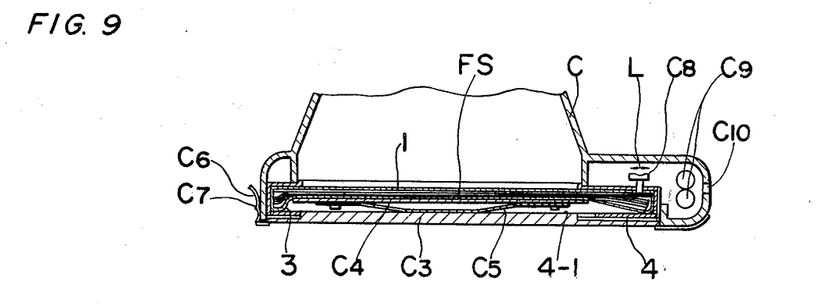
Figure 10:
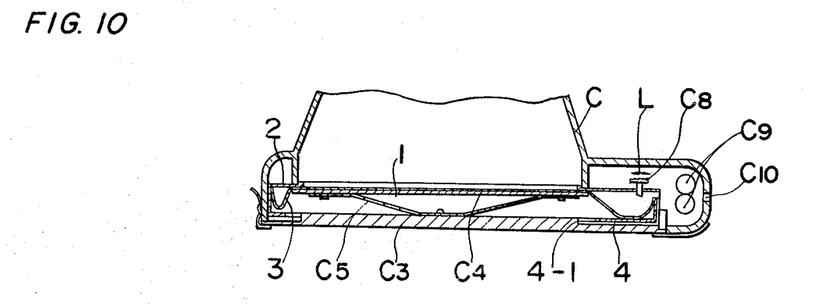

In FIGS. 8–10, there is shown the camera C into which the cassette 1 is loaded. It will be understood, of course, that the type of camera shown in FIGS. 8–10 is merely taken by way of example, and the film cassette of the invention is by no means limited to use with the illustrated type of camera only, but may be used with equal facility in association with other types of camera.

Referring to FIG. 8, it may be seen that the camera C comprises a swing-out back cover C3. The right-hand end of the back cover C3 is pivotally mounted at the right-hand end of the rear of the camera C, whereby the back cover C3 may be swung open to expose the rear of the camera C. A curved, spring-plate catch C6 is mounted on the left-hand end of the back cover C3. When the back cover C3 is closed, the catch C6 engages a stud C7, which is fixedly attached to the left-hand side of the camera C, whereby the back cover C3 is held in place, and seals the camera C. On the inner, that is, forward, side of the back cover C3, there is mounted a plate spring assembly C5. A pressure plate C4 is mounted on, and constantly urged forwards by, the plate spring assembly C5. In a more forward part of the camera C, there is formed a positioning frame C1, which is complementary in shape to the front frame 2 of the cassette 1, and positions the cassette 1 in such a manner that foremost film-sheets contained therein may be correctly exposed through the opening 2-1 of the front frame 2 to light reflected from external objects and directed through a camera lens (not shown in the drawings). On the right and left of the interior of the camera C, and rearwards of the positioning frame C1, there are formed mounting portions C2, into which the left-hand and right-hand sides of the cassette 1 may be fitted, whereby the cassette 1 may be correctly held in the camera C. In an extreme right-hand portion of the interior of the camera C, there is provided a pair of processing rolls C9, which is in operative connection with a camera shutter release mechanism (not shown in the drawing) in a known manner. After exposure, successive foremost film-sheets FS in the cassette 1, in the camera C, are drawn rightwards to the rolls C9, by the abovementioned pawl C8, which is in operative connection with the camera shutter release mechanism in a known manner. The rolls C9 draw exposed film-sheets FS further rightwards, and direct the film-sheets FS to, and through an extraction opening C10 located in the right-hand side of the camera C, while simultaneously causing processing solution contained in the sacs FS2 of the exposed film-sheets FS to be extruded, whereby positive images of external objects are obtained on the positive image surface of the film-sheets FS, in a conventionally known manner.

Referring now to FIGS. 8, 9, 10, in order to load a required number of film-sheets FS into the camera C, the camera back cover C3 is swung open, and the cassette 1, containing the required number of film-sheets FS, is simply inserted into the camera C, the left-hand and right-hand ends thereof being fitted into, and held by the mounting portions C2, and the front frame 2 thereof fitting against the positioning frame C1. The configuration at this stage is as shown in FIG. 8. Next, the back cover C3 is closed, and held in place by the stud C6 and catch C7, as shown in FIG. 9. Hereupon the pressure plate C4 passes into the opening 4–1 of the cassette rear frame 1, and, due to the forward-acting force of the plate spring assembly C5, presses against the rear portion of the collapsible cover 3, and exerts a forwards force on the film-sheets FS contained in the cassette 1.

Next, a blank shot is taken, that is, a lens cover is retained on the camera lens, to prevent entry of light into the camera, and the pawl C8 is actuated. When actuated, the pawl C8 enters the notch 2—2 of the cassette front plate 2, pierces the patch S2 covering the holes S1 near the upper right-hand corners of the supplementary light-proof sheet S, engages the hole S2, moves rightwards along the notch 2—2, draws the supplementary sheet S rightwards through the slit 5 at the front end of the cassette right-hand side wall 4–2 and brings the supplementary sheet S to the rolls C9, which direct the sheet S through the extraction opening C10, as described above. The supplementary sheet S having been removed, the pressure plate C4 moves the film-sheets FS in the cassette 1 forwards slightly, and the foremost film-sheet FS is brought into contact with the rear side of the cassette front frame 2, and into a position in which it may be correctly exposed, to form an image of an external object on the exposure film surface of the film-sheet FS. When this foremost film-sheet FS has been exposed, and removed by the pawl C8, in the manner described above, the remaining film-sheets are moved forwards by the pressure plate C4, and the next foremost film-sheet FS is brought to the exposure position. This process is repeated for each shot taken, the film-sheets FS are steadily moved forwards, and successive film-sheets are brought to the exposure position, while at the same time the cover 3 steadily folds to permit this forward movement of film-sheets FS. When all the film-sheets FS have been exposed and removed, the pressure plate C4 itself is brought into contact with the cassette front frame 2 through the cover 3, as shown in FIG. 10.

Figure 11:
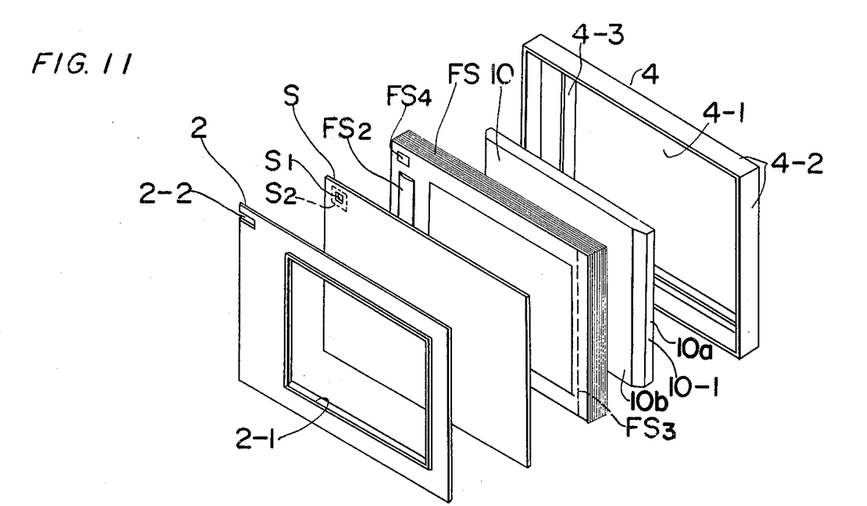
FIG. 11 is an exploded view of a film cassette according to a 2nd embodiment of the invention.

Referring now to FIG. 11, there is shown a 2nd embodiment of the invention, which while the same in many respects when compared with the abovedescribed 1st embodiment, differs therefrom in that the light-proof cover 3 is not employed and there is employed, instead, a light-proof plate 10.

Figure 12:
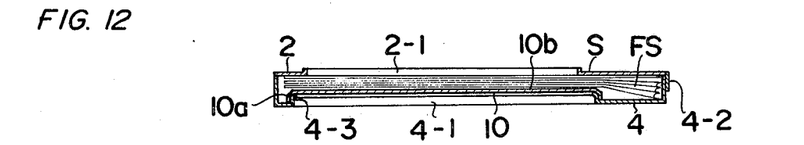
FIG. 12 is a cross-sectional view of the film cassette of FIG. 11, FIGS. 13, 14, 15 are cross-sectional views of modifications of a film cassette according to the 2nd embodiment of the invention, respectively.

The light-proof plate 10 is an integral unit, which may be conveniently considered as constituting two rectangular block portions which are a rear-side block portion 10a, equal in length and width to the cassette rear frame opening 4–1, and a smaller, forward-side block portion 10b. Around the periphery of the opening 4–1 there is formed a ledge 4–3 which projects forwards at right-angles therefrom, that is, towards the interior of the cassette 1, and whose depth is equal to the thickness of the rear block portion 10a of the light-proof plate 10. Also, around the periphery of the opening 4–1, at the rear edge of the ledge 4–3, there is formed a small ridge 4–3a, which projects inwards with respect to the opening 4–1. The block portion 10a fits exactly, and slideably against the sides of the ledge 4–3, and is prevented from moving rearwards out of the opening 4–1 by the ridge 4–3a, which also further ensures exclusion of light from the interior of the cassette 1. In this configuration, the block portion 10b projects forwards of the block portion 10a and ledge 4–3, as illustrated in FIG. 12. A required number of film-sheets FS is packed in the cassette 1, the main areas of the film-sheets FS lying in line with the front surface of the block portion 10b, and the sacs FS2 and wiper boards FS3 lying, respectively, to the left and right thereof, as also shown in FIG. 12. When the cassette 1 is inserted in the camera C, the pressure plate C4 fits into the rear frame opening 4–1, contacts and presses the light-proof plate 10, and this pressure is transmitted to the film-sheets FS. As the supplementary sheet S, and successive foremost film-sheets FS are removed, the plate 10 is slid forwards along the sides of the ledge 4–3, and the film-sheets are moved steadily forwards, as described above.

Figure 13:
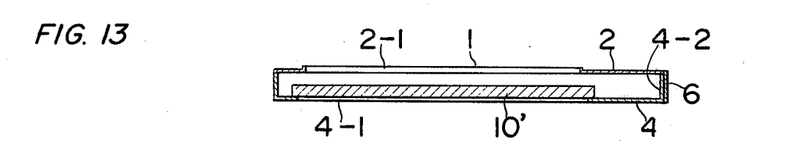
Figure 14:
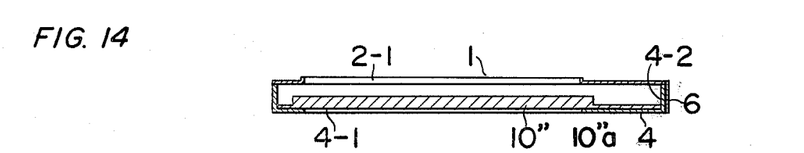
Figure 15:
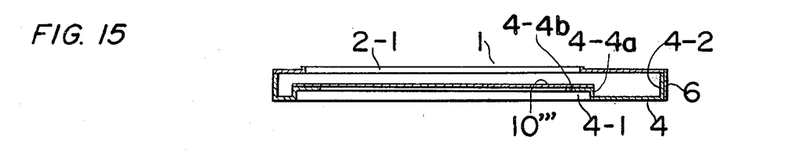

FIGS. 13, 14, 15 illustrate modifications, of the 2nd embodiment of the invention, in all of which there is employed a light-proof plate in place of the light-proof cover 3.

In the modification shown in FIG. 13, the cassette rear frame 4 is the same as in the 1st embodiment, that is, there is no forward projecting ledge around the periphery of the opening 4–1. Exclusion of light through the opening 4–1 is effected by a rectangular light-proof plate 10', which is larger in length and width than the opening 4–1, and which is lightly bounded to the inner side of the rear frame 4 by a suitable chemicals at first, around the periphery of the opening 4–1. Film-sheets FS are contained, in the cassette 1, between the light-proof plate 10' and the front frame 2. When the cassette 1 is inserted in the camera C, the forwards pressure of the plate C4 breaks the bonding between the plate 10 and rear frame 4, and film-sheets FS are steadily moved forwards, as preceding film-sheets FS are exposed and removed.

In the modification shown in FIG. 14, the rear frame 4 forms a simple opening 4–1, as in the 1st embodiment. To prevent entry of light through the opening 4–1 into the interior of the cassette 1, there is employed a light-proof plate 10'', which is slightly larger in length and width than the opening 4–1, and which forms a rim 10''a. The plate 10'' is lightly bonded to the inner side of the rear frame 4, a round the periphery of the opening 4–1. The rim 10a'' is thinner than the main portion of the plate 10'', and extends therefrom to the top, bottom, and side walls 4–2 of the cassette 1. A required number of film-sheets FS is packed between the plate 10'' and front frame 2, the main portions of the film-sheets FS lying in alignment with the main portion of the plate 10'', and the sacs FS1 and wiper boards FS2 lying in alignment with portions of the rim 10a''. After insertion of the cassette 1 into the camera C, forwards pressure from the pressure plate C4 breaks the bonding between the light-proof plate 10'' and rear frame 4, and is transmitted through the plate 10'' to the film-sheets FS. As the film-sheets FS and plate 10'' are moved forwards the outer periphery of the rim 10a" moves along in contact with the top, bottom, and side walls 4-2.

In the modification shown in FIG. 15, a ledge 4-4a extends forwards at right-angles from the periphery of the opening 4-1, and another ledge 4-4b extends at right-angles from the forward edge of the ledge 4-4a and inwards with respect to the opening 4-1. In other words, the ledge 4-4b is generally parallel to the front frame 2. A light-proof plate 10''', which is equal in length and width to the opening 4-1, is lightly bonded to the ledge 4-4b, on the front side thereof. The pressure plate C4 in the camera C fits into the opening 4-1, breaks the bonding between the plate 10''' and ledge 4-4b, and transmits forwards pressure on through the plate 10''' film-sheets FS in the cassette 1, whereby the film-sheets FS may be steadily moved forwards.

Figure 16:
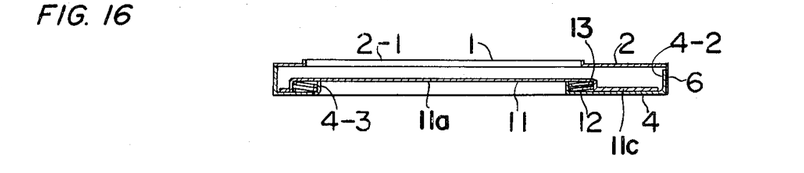
FIG. 16 is a cross-sectional view of a film cassette according to a 3rd embodiment of the invention.

In FIG. 16 there is shown a 3rd embodiment, which while the same in a number of respects when compared to the 1st and 2nd embodiments also differs in a number of respects, all of which will become apparent below.

In FIG. 16, the rear frame 4 comprises a ledge 4-3 extending forwards, at right-angles, from the periphery of the opening 4-1. A dished plate 11 of light-proof material is provided on the inside of the opening 4-1 and ledge 4-3. The plate 11 comprises a main portion 11a, which is larger in length and width than the opening 4-1, sides 11b, which are equal in depth to the ledge 4-3, and a rim 11c, which extends from the sides 11b to the cassette side walls 4-2. Film-sheets are initially packed between the plate 11 and front frame 2, whereby the plate 11 is brought into contact with the front edge of the ledge 4-3. In this configuration, on both the left and right of the ledge 4-3, there is formed an enclosure 13 which is bounded by a left-hand or right-hand end of the main plate portion 11a, side 11b, ledge 4-3 and rear frame 4. An expansion spring 12 is mounted in each enclosure 13. The rear end of each expansion spring 12 is fixedly attached to the rear frame 4, and the front end thereof is fixedly attached to the plate 11. The springs 12 exert a constant forwards pressure on the plate 11, and on the film-sheets FS. This embodiment therefore does not require the associated camera C to be provided with a plate spring assembly C5 and pressure plate C4, but film sheets FS are steadily advanced to exposure position by the force of the spring 12.

Figure 17:
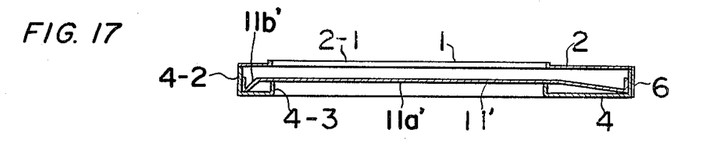
FIG. 17 is a cross-sectional view of a modification of the film cassette according to the 3rd embodiment of the invention.

FIG. 17 shows a modification of the 3rd embodiment, in which the rear frame 4 comprises a forwards projecting ledge 4-3, and the plate 11 is replaced by a spring plate or diaphragm 11'. The spring plate 11' comprises a main portion 11a', which is larger in length and width than the opening 4-1, and side extensions 11b', which extend to, and press against the side walls 4-2. The spring plate 11' is always tensed against the side walls 4-2, and the force of the spring plate 11' urges the plate 11' towards the front frame 2. A required number of film-sheets FS is packed into the cassette 1 between the front frame 2 and spring plate 11. In this configuration, the plate main portion 11a' contacts the front edge of the ledge 4-3, and the plate 11' exerts forwards pressure on the film-sheets FS. In this case, also, the associated camera C is not required to be provided with a means for advance of film-sheets FS, since this advance is effected by the spring plate 11'.

Figure 18:
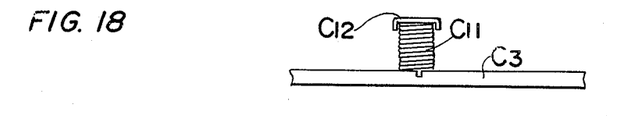
FIG. 18 is a side view of an alternative film-sheet advance means provided in a camera.
Figure 19:
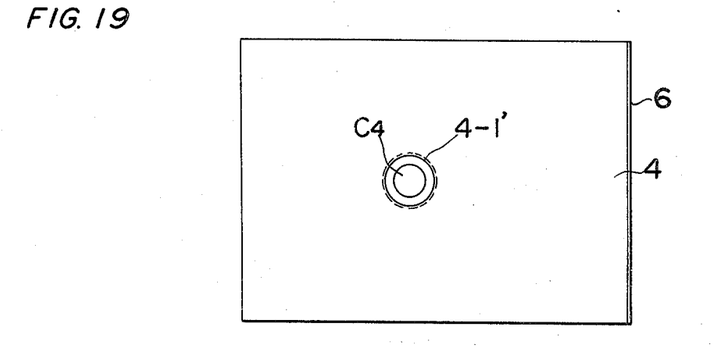
FIGS. 19, 20, 21 are alternative film cassette rear frame openings corresponding to different film-sheet advance means.
Figure 20:
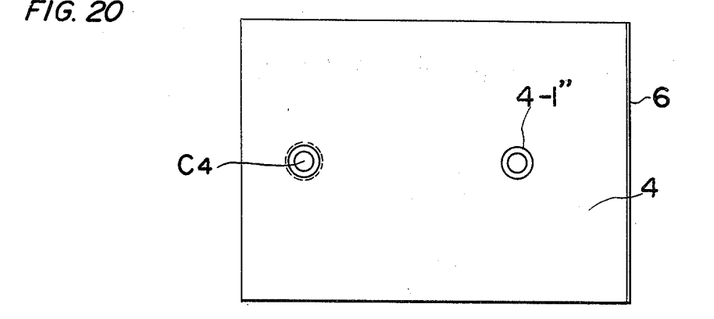
Figure 21:
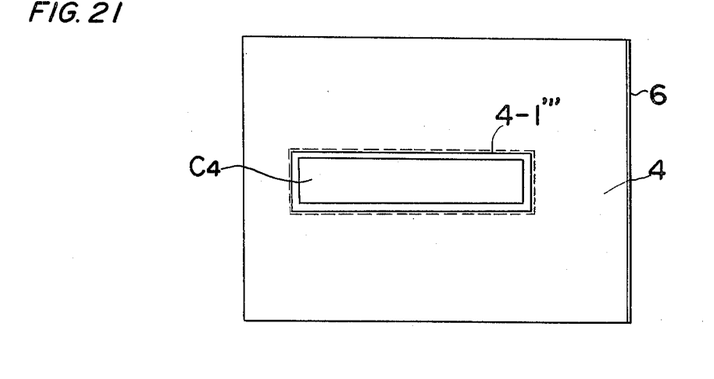

The film cassette of the invnetion is easily adapted to use with cameras having different film-sheet advance means. For example, an associated camera may be provided not with a plate spring assembly C5 and pressure plate C4, but with an expansion spring C11 mounted on the camera back cover C3, and provided with a cap C12, as shown in FIG. 18. In such a case, the cassette rear frame 4 is provided with a centrally located, circular opening 4-1', through which the cap C12 and spring C11 may pass, as shown in FIG. 19. If the camera is provided with two springs C11, the cassette rear frame 4 is provided with two corresponding openings 4-1'', as shown in FIG. 20. Similarly, if the camera is provided with a narrow film-sheet advance plate, the cassette rear frame 4 is provided with correspondingly shaped openings 4-3''', as shown in FIG. 21.

As is clear from the above description, the present invention provides a film cassette which is simple and cheap in construction, whereby the cost per film-sheet is reduced. The film cassette of the invention also offers the advantage that force to advance film-sheets to a foremost exposure position is applied evenly, and there is therefore no bending of film-sheets in the cassette. The film cassette of the invention is also light and compact, which offers the advantages that associated cameras are correspondingly lighter, more compact, and easier to handle, that a large number of film-sheets may be transported easily, and that manipulation of the cassette, and insertion thereof into a camera is simple.

Although the present invention has been fully described by way of the preferred embodiments thereof with reference to the accompanying drawings, it is to be noted that various changes and modifications are apparent to those skilled in the art. Therefore, unless otherwise such changes and modifications depart from the true scope of the present invention, they should be construed as included therein.

What is claimed is:

1. A film cassette for containing film-sheets each having an engagement hole near one corner thereof, comprising a front frame having an off-center opening therethrough with which the film surfaces of successive foremost film-sheets in the cassette are brought into alignment and are exposed to light therethrough and a notch extending from one side in alignment with said film sheet engagement holes, and through which a pawl means provided in a camera is passed to engage the hole of the foremost film sheet in the cassette and to draw the foremost sheet out of the cassette; a rear frame corresponding in size to said front frame, having an opening therethrough which permits a pressure means provided in the camera to pass therethrough and apply forward pressure on the film-sheet in the cassette, top, bottom and first side walls integrally formed with said rear frame and extending forward to said front frame and attached thereto, a second side wall integrally formed with said rear frame and extending to the proximity of said front frame, to form a passage through which successive foremost film-sheets are removed from the cassette; a first light-proof element provided inside said front frame to seal the opening thereof, having an engagement hole aligned with said engagement hole of said film sheets and which is removed from the cassette through said passage, said engagement hole in said first light proof element being covered by a patch of light proof paper; a second light-proof element provided inside said rear frame to seal the opening thereof, and which is moved forward by said pressure means of the camera; and a flap having length and width dimensions greater than said passage and pivotally attached to the exterior of said second side such that said flap normally covers said passage to prevent the entrance of light into said cassette, but is pivotable to allow the exit of the foremost film sheet from the cassette.

2. A film cassette as defined in claim 1, wherein said second light-proof element comprises a cover forming a bag-like protection, the rear end of which fits into the inside of the rear frame, and which extends forwards to the vicinity of the front frame.

3. A film cassette as defined in claim 1, wherein said second light-proof element comprises a plate which is larger in size than the opening of the rear frame, and which is lightly bonded to the inner side of the rear frame, around the periphery of the opening, the bonding between the plate and the rear frame being broken by the pressure means of the camera to permit the film-sheets forwards, as preceding film-sheets are exposed and removed.

4. A film cassette as defined in claim 1 wherein said first light-proof element comprises a flat sheet having the same general dimensions as the front frame.

* * * * *